(12) United States Patent
Sanchez et al.

(10) Patent No.: US 11,173,847 B1
(45) Date of Patent: *Nov. 16, 2021

(54) CONCEALED, SECURE STORAGE COMPARTMENT

(71) Applicant: ANTHONY & KIMBERLEE SANCHEZ FAMILY TRUST, Pleasanton, CA (US)

(72) Inventors: Anthony J. Sanchez, Pleasanton, CA (US); James E. Grimes, Yorba Linda, CA (US)

(73) Assignee: Anthony and Kimberlee Sanchez Family Trust, Pleasanton, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/304,400

(22) Filed: Jun. 21, 2021

Related U.S. Application Data

(63) Continuation-in-part of application No. 17/248,715, filed on Feb. 4, 2021, now Pat. No. 11,040,665.

(51) Int. Cl.
*B60R 7/04* (2006.01)
*E05B 83/28* (2014.01)

(52) U.S. Cl.
CPC .............. *B60R 7/04* (2013.01); *E05B 83/28* (2013.01)

(58) Field of Classification Search
CPC .... B60R 7/04; B60R 7/02; B60R 5/02; B60R 5/04; B60R 7/043; B62D 25/087; B62D 33/04; B62D 43/06

USPC ........... 296/24.46, 37.2, 37.14, 37.15, 37.16
See application file for complete search history.

(56) References Cited

U.S. PATENT DOCUMENTS

| | | | | |
|---|---|---|---|---|
| 6,254,162 | B1 * | 7/2001 | Faber | B60R 5/04 296/37.6 |
| 6,866,319 | B2 * | 3/2005 | Hupfer | B60R 7/04 296/37.8 |
| 10,744,949 | B2 * | 8/2020 | Andrus | B60R 7/04 |
| 11,040,665 | B1 * | 6/2021 | Sanchez | B60R 7/04 |

\* cited by examiner

*Primary Examiner* — Stephen T Gordon
(74) *Attorney, Agent, or Firm* — Charles L. Thoeming

(57) ABSTRACT

Embodiments of a concealed, secure storage compartment include a concealed floorboard storage compartment for a front passenger side floorboard of a vehicle to provide a unitary floorboard containment shield sized to fit under the passenger side floormat and a hinged attachment plate securing the containment shield to the firewall portion of the passenger side floorboard padding. The containment shield provides an open bottom, a substantially planar top side surface upon which the bottom of the passenger side floormat rests, and internally reinforced sides affixed to the planar top side and its underside surface in the interior portion of the containment shield. An embodiment of the concealed, secure storage compartment provides a locking assembly securing the containment shield and floormat from being raised absent an unlocking key.

17 Claims, 11 Drawing Sheets

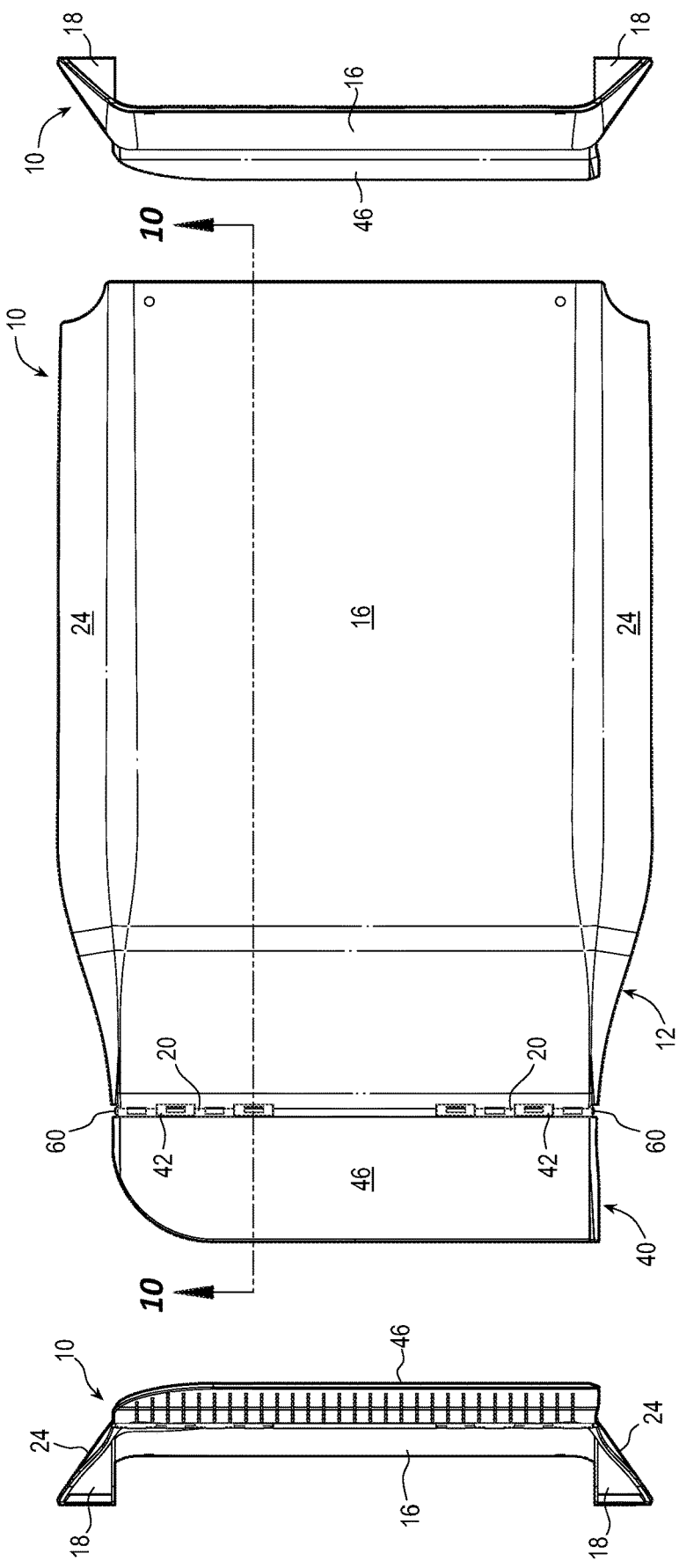

CONCEALED, SECURE STORAGE COMPARTMENT

CROSS-REFERENCES TO RELATED APPLICATIONS

This continuation-in-part non-provisional utility patent application claims the benefit of U.S. non-provisional utility application Ser. No. 17/248,715, filed Feb. 4, 2021, now U.S. Pat. No. 12,040,665, issued Jun. 22, 2021.

STATEMENT REGARDING FEDERALLY SPONSORED RESEARCH OR DEVELOPMENT

None.

REFERENCE TO A MICRO-FICHE APPENDIX

None.

NOTICE REGARDING COPYRIGHTED MATERIAL

A portion of disclosing this patent document contains material subject to copyright protection and/or copyright registration. The copyright owner has no objection to the facsimile reproduction by anyone of the patent document or the patent disclosure as it appears in the file or records maintained by the United States Patent and Trademark Office, but the copyright owner otherwise reserves all copyright rights.

TECHNICAL FIELD

The present application relates generally to the field of storage against theft and more specifically to a concealed, secure storage compartment suitable for automotive use.

BACKGROUND OF THE INVENTION

Portable technology has advanced and encouraged people to communicate, engage in business, and enhance entertainment. These circumstances also encourage people to travel with their technology. The relative high value of this technology, however, and its ease of conversion to cash, has also encouraged portable technology theft, aided by the disadvantage that some technology, notably laptop computers, are not as easy to keep out of sight as smaller portable technology. The crime of opportunity by breaking automobile windows for theft of these advanced technology items and other small non-technical personal items has increased. This criminal activity is known to law enforcement and insurance companies as "smash-and-grab." In the first six-months of 2020, the San Francisco, Calif. Police Department reported Police making 303 arrests for smash-and-grab burglaries.

The main targets for smash-and-grab thieves are valuables easily identified from outside an automobile. These items that being targeted for smash-and-grab crime are quick and easy to sell and include handbags, purses, and wallets; laptops, backpacks, or briefcases; shopping bags; cell phones, tablets, or GPS systems; money; and keys.

Since most smash-and-grab criminals work on impulse, the principal way to combat smash-and-grab opportunity is to reduce the attractions by removing the targeted possessions from visibility by anybody walking past a vehicle.

Thus, there is a need for a simple and inexpensive concealed automotive vehicle storage compartment that would provide an environment to safely house laptop computers, tablet computers, mobile telephones, billfolds, keys, and similar small personal items and keep them from view from outside the vehicle without the necessity of opening outside vehicular storage areas.

There likewise is a need for a concealed automotive vehicle storage compartment automotive vehicle storage compartment that can be easily retrofitted into any existing motor vehicle.

There also is a need for a concealed automotive vehicle storage compartment that can be inexpensively manufactured from recycled materials, and which itself can ultimately be recycled.

DISCLOSURE OF INVENTION

An embodiment of the concealed, secure storage compartment includes a concealed floorboard storage compartment for a front passenger side floorboard of a vehicle to provide a unitary floorboard containment shield sized to fit under the passenger side floormat and a hinged attachment plate securing the containment shield to the firewall portion of the passenger side floorboard padding. The containment shield provides an open bottom, a substantially planar top side surface upon which the bottom of the passenger side floormat rests, and internally reinforced sides affixed to the planar top side and its underside surface in the interior portion of the containment shield. In one variant, the hinged attachment plate underside includes arrays of evenly sized and spaced teeth sized to grip and engage carpeting nap on the firewall portion of the passenger side floorboard padding. In another variant, the hinged attachment plate underside includes hook and loop fasteners to grip and engage hook and loop fasteners on the firewall portion of the passenger side floorboard padding. The containment shield provides a hidden, secure repository for laptop computers, tablet computers, mobile telephones, billfolds, keys, and similar small personal items without the necessity of opening outside vehicular storage areas.

In an embodiment of the concealed, secure storage compartment, hinge elements of the containment shield hinged distal end and the hinged attachment plate proximal end serve to releasably connect the containment shield and attachment plate and secure the acute angle of containment shield deflection upwards from the passenger side floorboard padding once it is positioned and secured between the passenger side floormat and the passenger side floorboard padding to allow placement and concealment of high-priced, microprocessor-based digital computing or communication products under the passenger floormat and containment shield. In a variant, hinge pins secure the hinged ends to prevent undesired decoupling of the containment shield and attachment plate when the concealed, secure storage compartment is not in place.

An embodiment of the concealed, secure storage compartment provides a locking assembly securing the containment shield and floormat from being raised absent an unlocking key.

BRIEF DESCRIPTION OF DRAWINGS

These and other features, aspects, and advantages of the concealed, secure storage compartment will become better understood regarding the following description, and drawings as further described.

FIG. 5 is a planar top view of the embodiment of the concealed, secure storage compartment 10 of FIG. 1.

FIG. 6 is a left side elevational view of the embodiment of the concealed, secure storage compartment 10 of FIG. 5.

FIG. 7 is a rear elevational view of the embodiment of the concealed, secure storage compartment 10 of FIG. 5.

FIG. 8 is a front elevational view of the embodiment of the concealed, secure storage compartment 10 of FIG. 5.

BEST MODE FOR CARRYING OUT THE INVENTION

Figure 1:
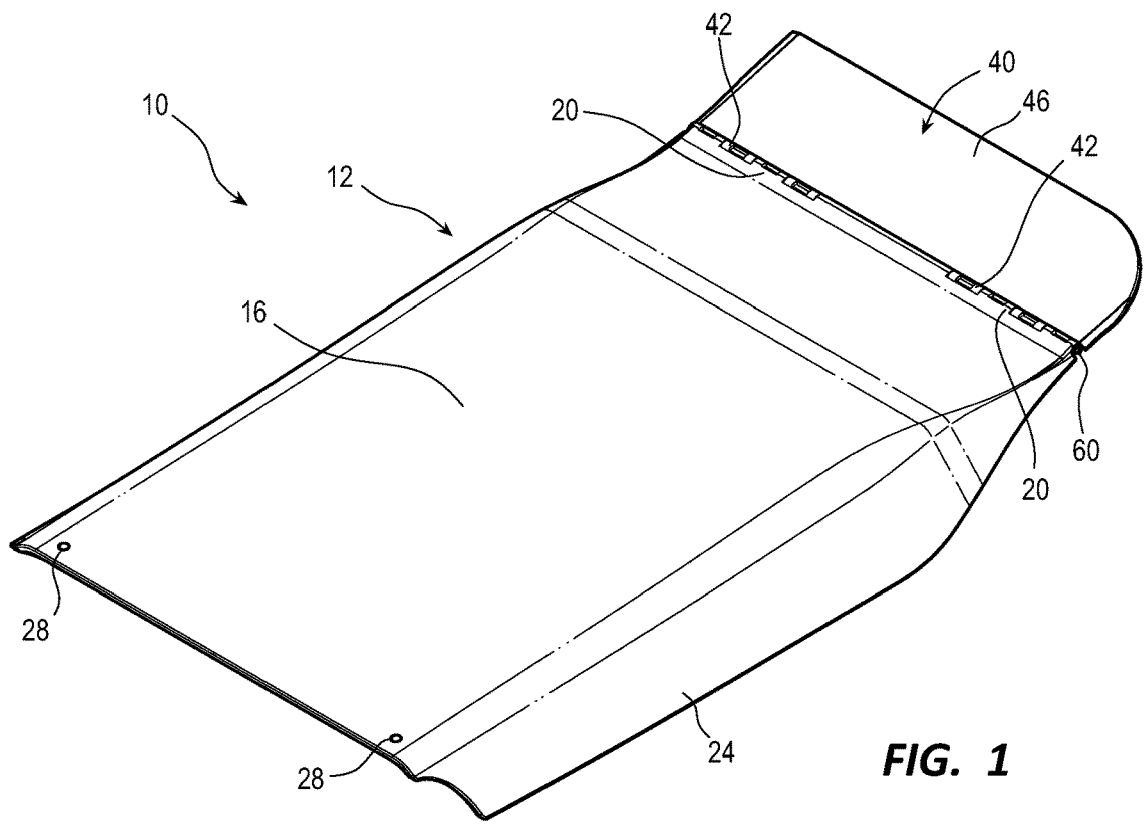
FIG. 1 is a top right front perspective view of an embodiment of the concealed, secure storage compartment 10.
Figure 2:
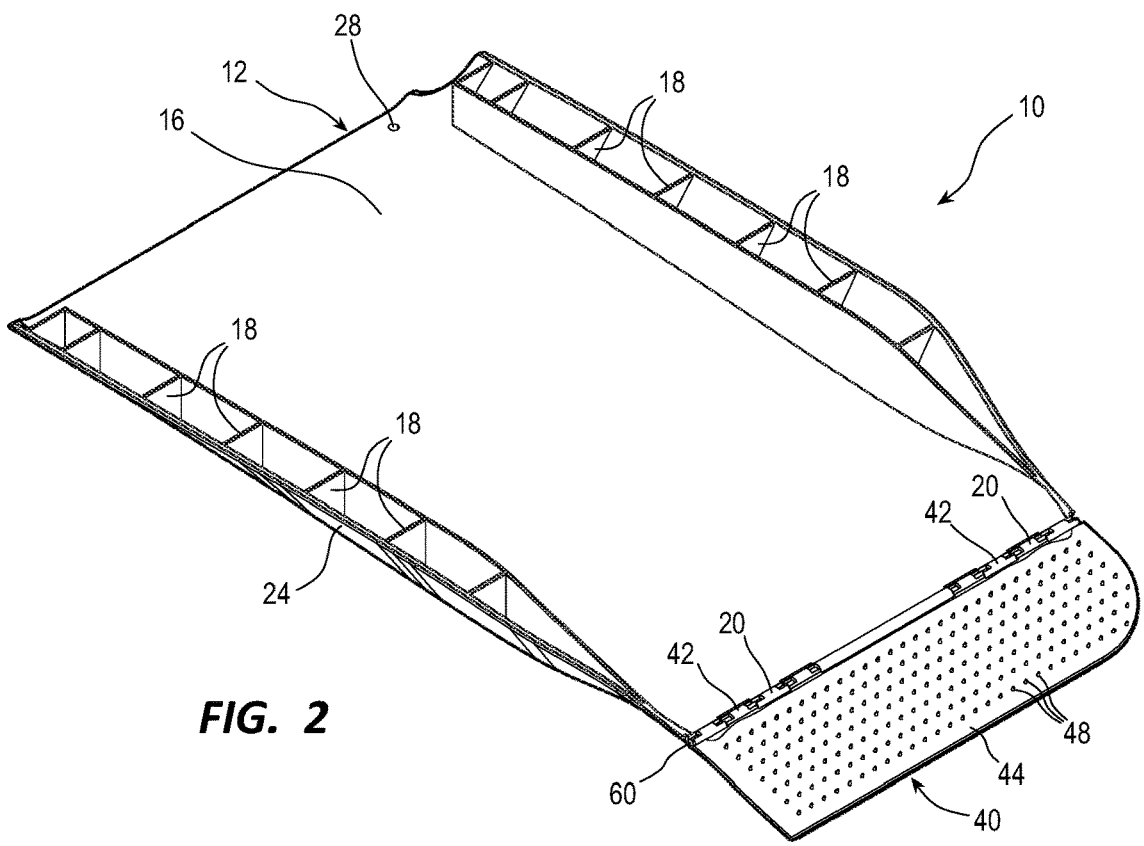
FIG. 2 is a bottom left rear perspective view of the embodiment of concealed, secure storage compartment of FIG. 1.
Figure 3:
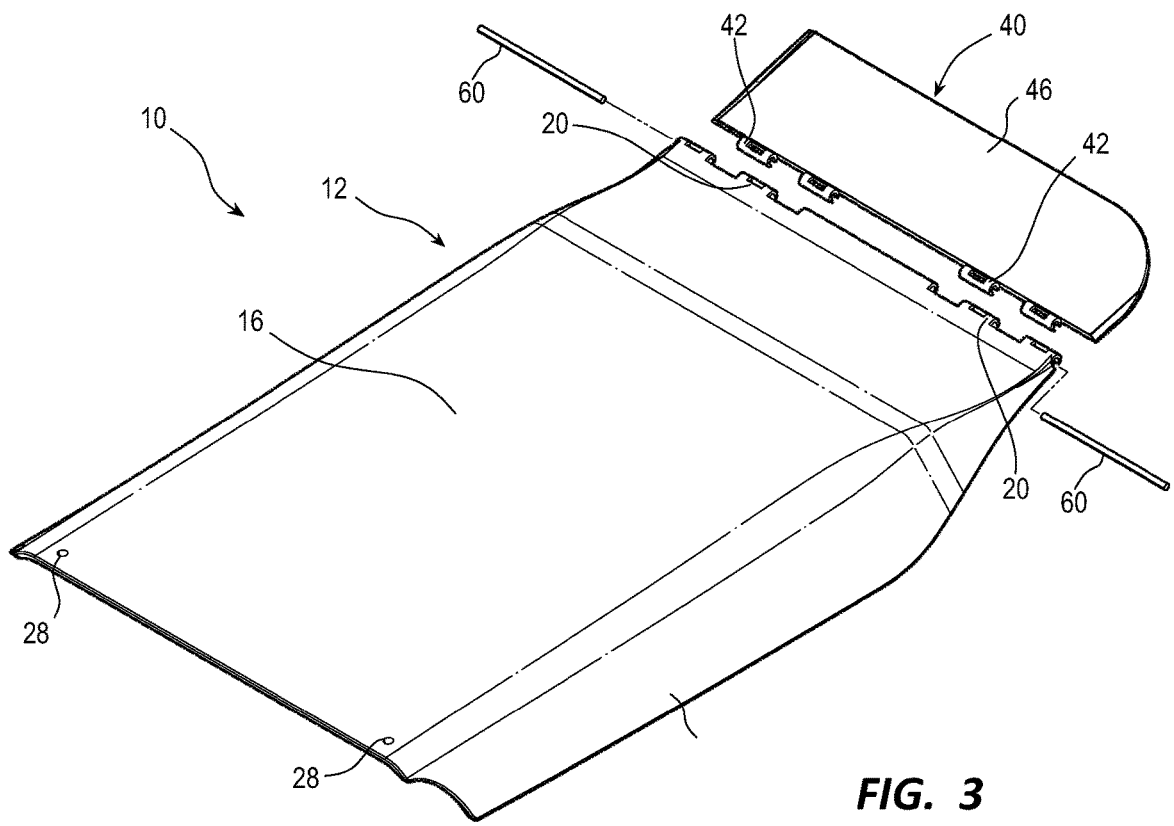
FIG. 3 is an exploded view of the embodiment of the concealed, secure storage compartment 10 of FIG. 1.
Figure 4:
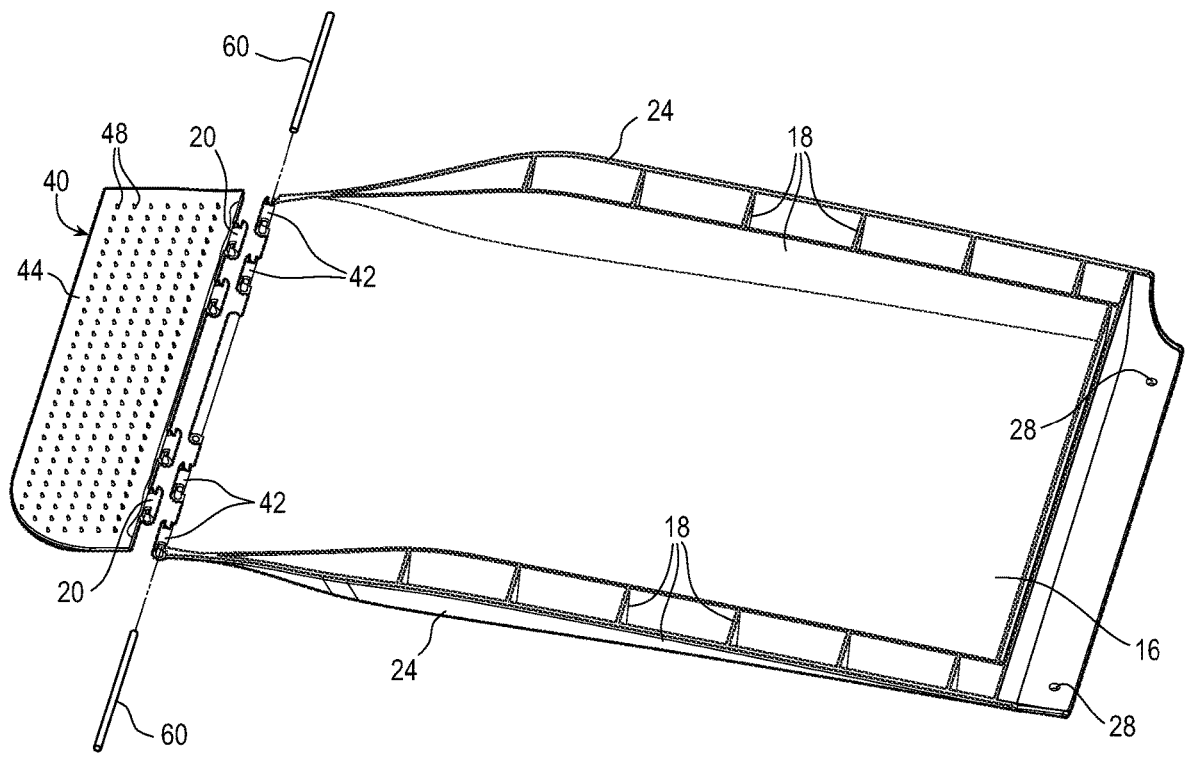
FIG. 4 is a right front exploded perspective view of the bottom of the embodiment of the concealed, secure storage compartment 10 of FIG. 1.
Figure 9:
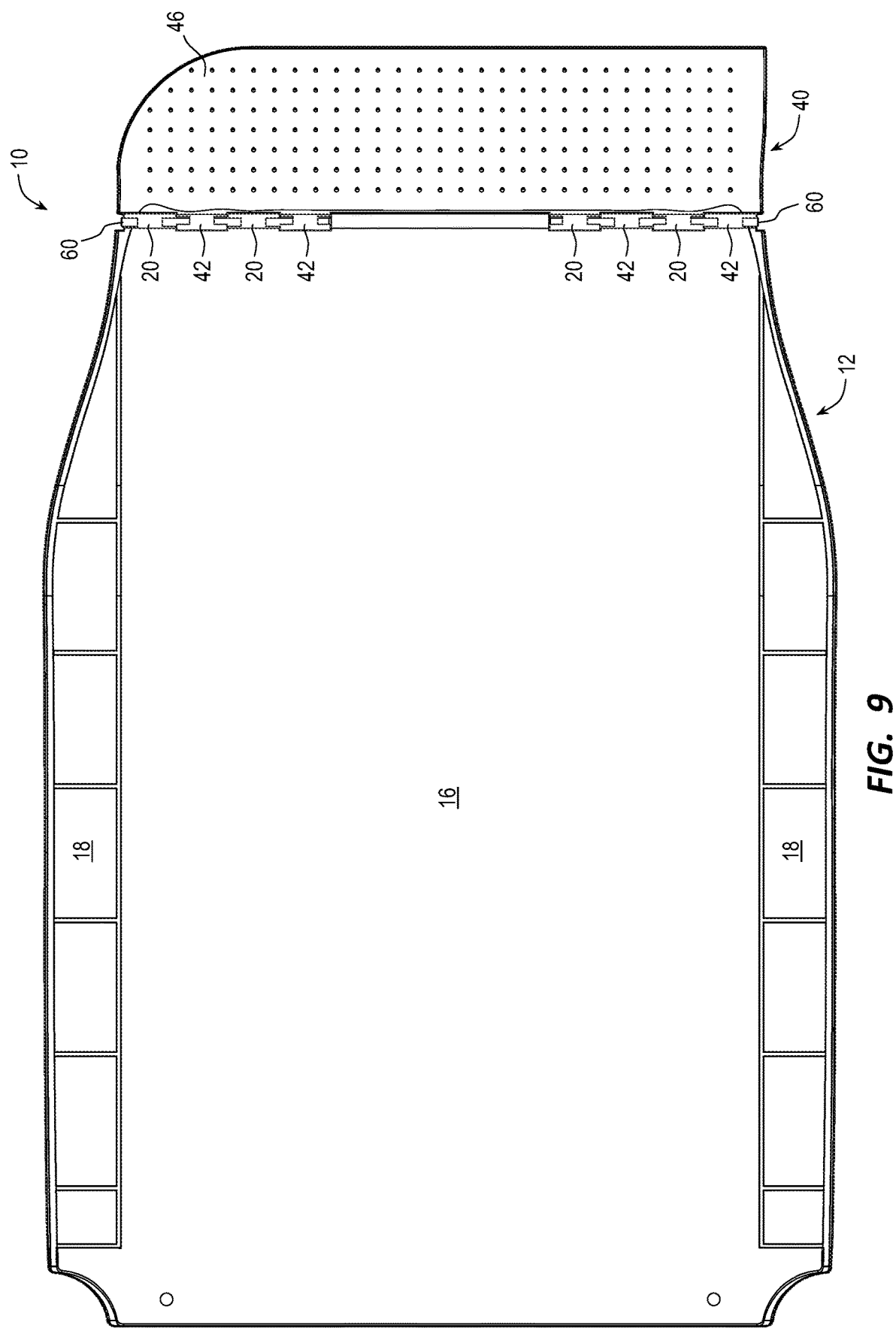
FIG. 9 is a planar bottom view of the embodiment of the concealed, secure storage compartment 10 of FIG. 5.
Figure 10:
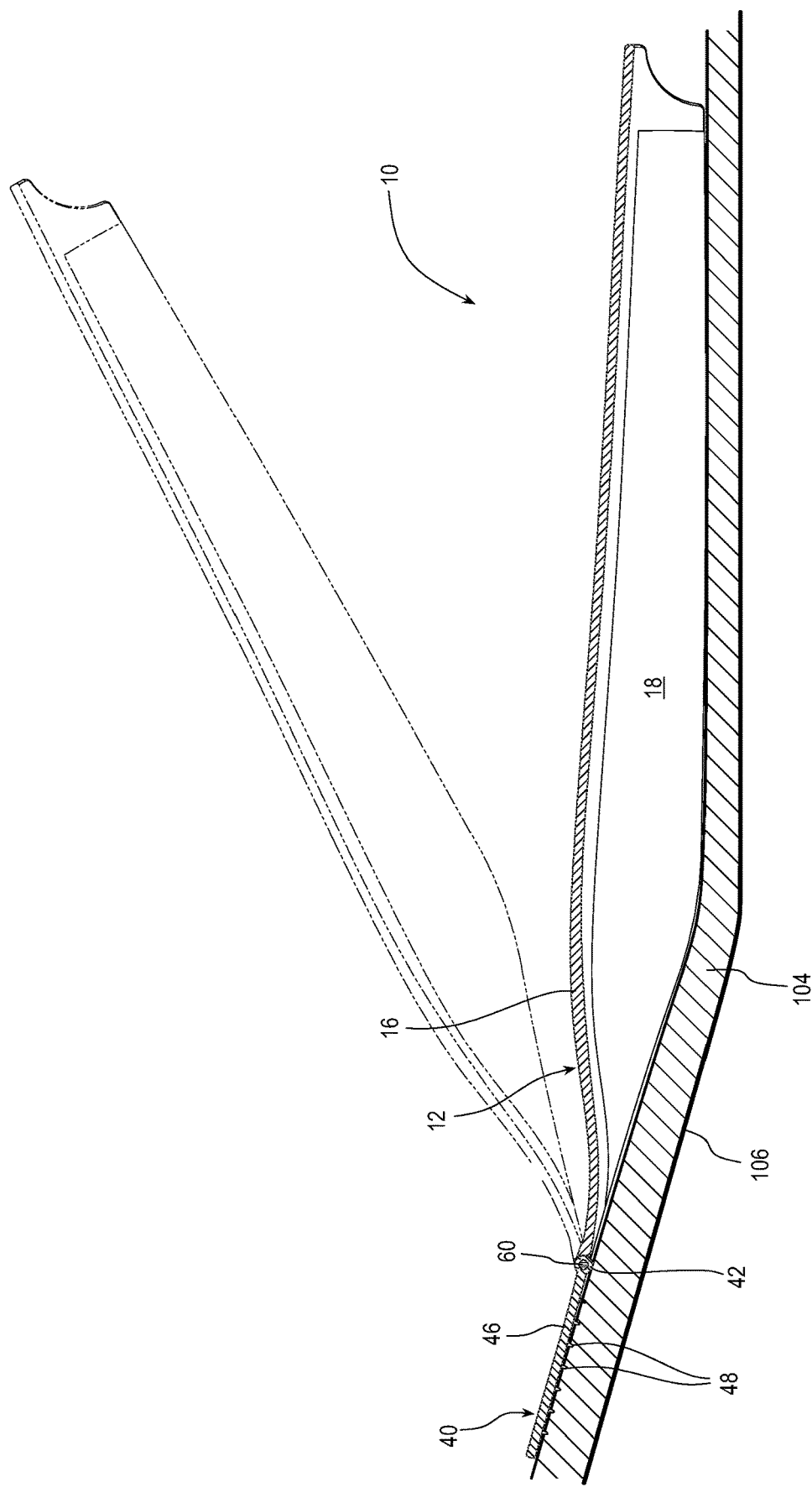
FIG. 10 is a cross-sectional view of the left side view of the embodiment of the concealed, secure storage compartment 10 of FIG. 5 being placed upon a firewall floor surface carpet with nap or pile taken at "10-10."
Figure 11A:
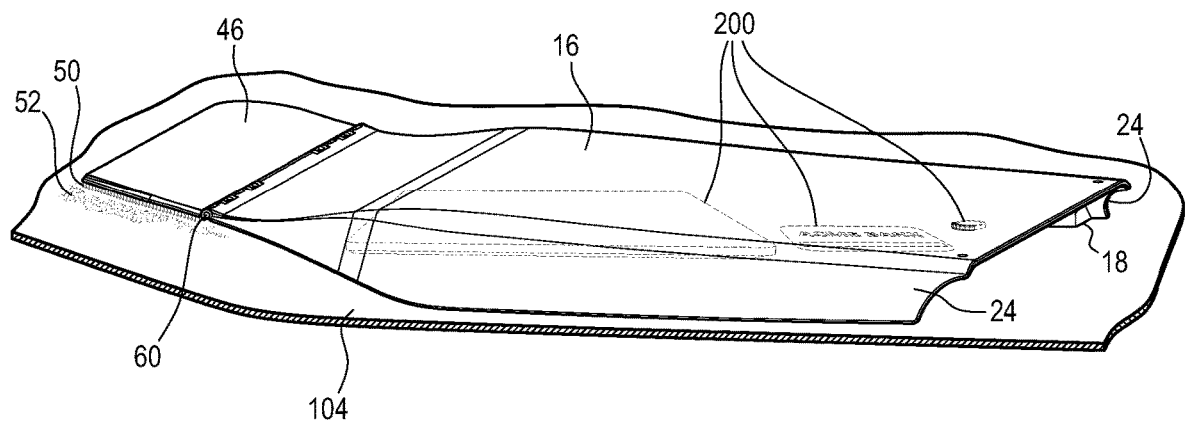
FIG. 11A is a top left front perspective view of the embodiment of the concealed, secure storage compartment 10 of FIG. 1 with items of personal property stored under and within the space below the containment shield 16.
Figure 11B:
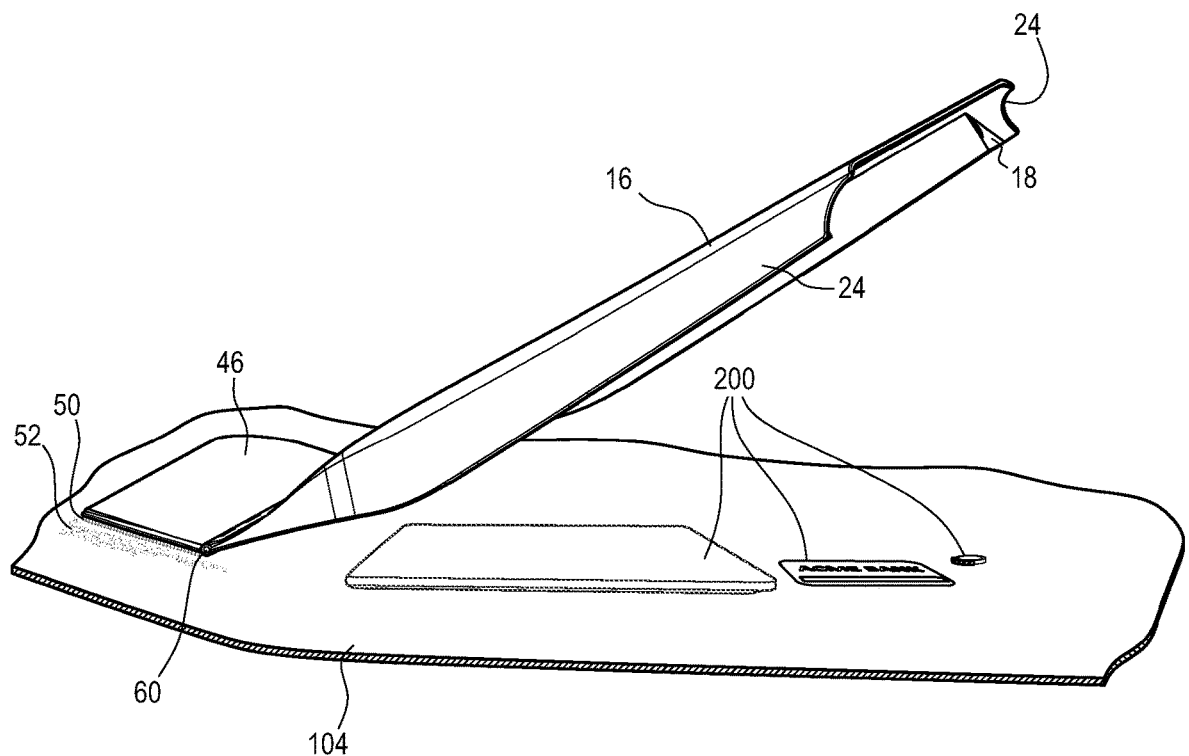
FIG. 11B is a top left front perspective view of FIG. 11A with the containment shield 16 lifted to access the items of personal property 200.

Embodiments of a concealed, secure storage compartment 10 reusable are disclosed generally in FIGS. 1-18.

An embodiment of a secured, concealed storage compartment 10 provides a containment shield 12 having a containment shield topside surface 16 which includes a proximal end 22 and a distal hinged end 20, FIGS. 1-10, and 17. A containment shield underside surface 14 includes a proximal end 22 and a distal hinged end 20. Two containment shield side 14 surfaces at equal acute angles from the containment shield topside surface 16 and containment shield underside surface 14 include a plurality of containment shield reinforcement ribs 18 from a containment shield underside surface 14 boundary with each containment shield side surface 24 to each containment shield side surface 24. An alternate embodiment of a secured, concealed storage compartment 10 provides a reinforcement rib 18 across the full-length of the containment shield bottom side between opposite containment shield side surfaces 24 near the proximal end 22, FIGS. 17 and 18. Two equal sized containment shield mount holes 28 are spaced apart near the containment shield topside surface 16 and containment shield underside surface 14 proximal ends providing two equal sized apertures through the containment shield 12. The containment shield topside surface 16 and side surfaces 24 are sized to fit under a floormat portion 100 of an automobile vehicle passenger's side floor mat area, FIGS. 10-16.

An embodiment of a secured, concealed storage compartment 10 provides an attachment plate 40 including an attachment plate topside surface 46 having a distal end and a proximal hinged end 42 sized to connect to the containment shield distal hinged end 20, FIGS. 1-10. An attachment plate bottom surface has a distal end and a proximal hinged end 42 sized to connect to the containment shield distal hinged end 20. An attachment assembly is provided to releasably attach the attachment plate bottom surface 44 to a firewall portion 104 or 106 of an automobile vehicle passenger's side floor mat area.

Figure 13:
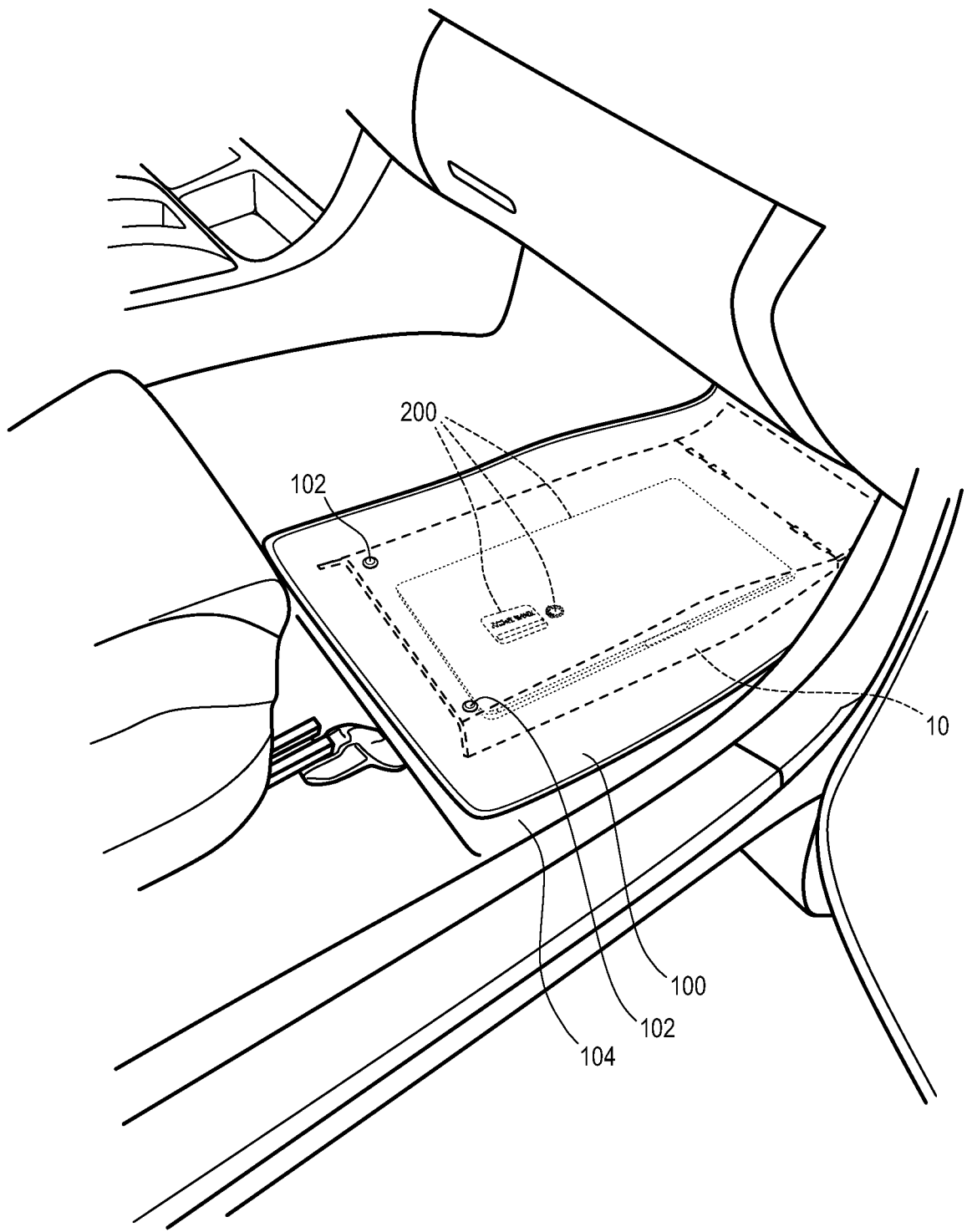
FIG. 13 is a right-side elevational view of an embodiment of the concealed, secure storage compartment 10 with items of personal property 200 stored within the compartment under the floor mat carpet 100.
Figure 14:
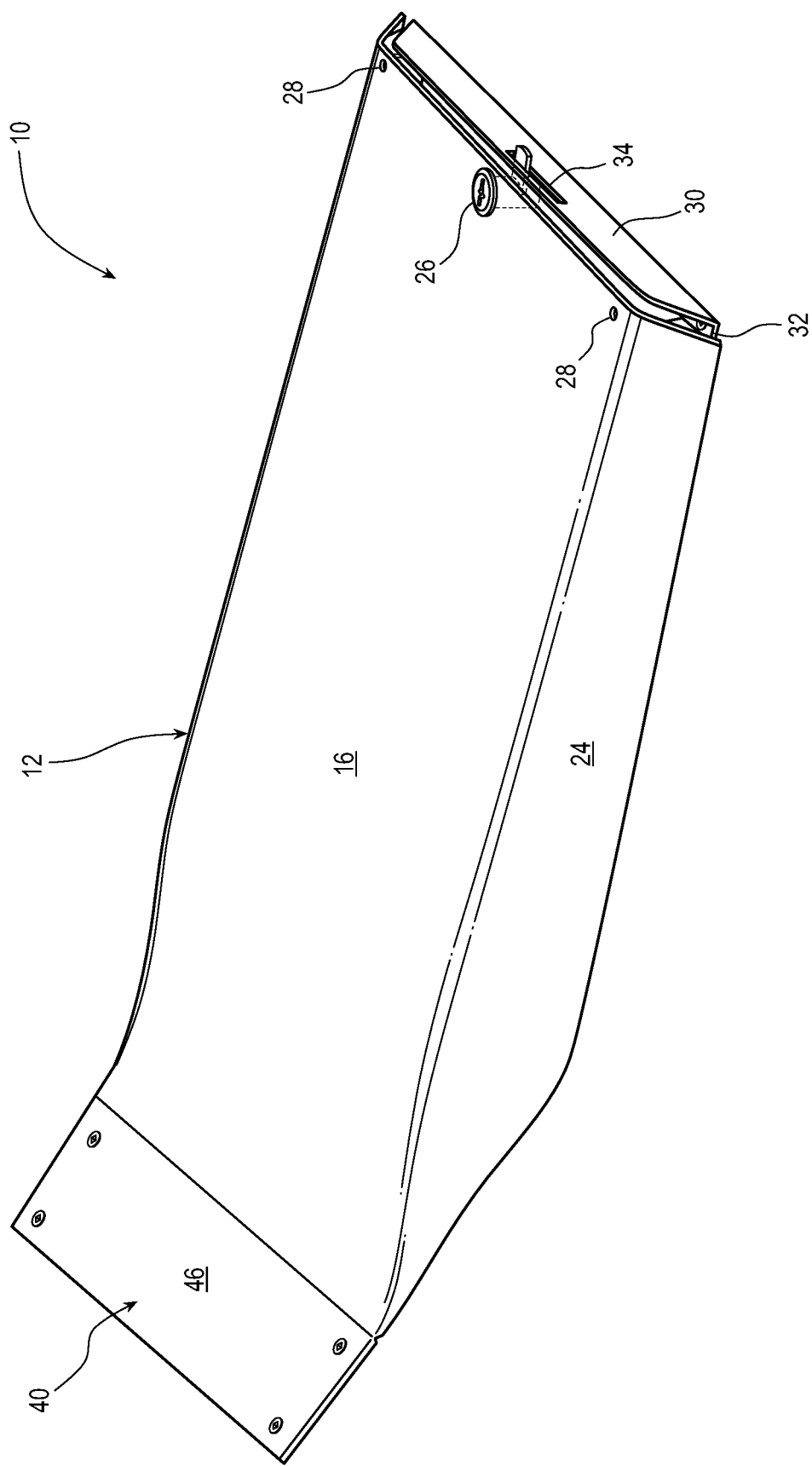
FIG. 14 is a left top perspective view of an embodiment of the concealed, secure storage compartment 10 providing a shield proximal end surface 30 and locking assembly 26.
Figure 15:
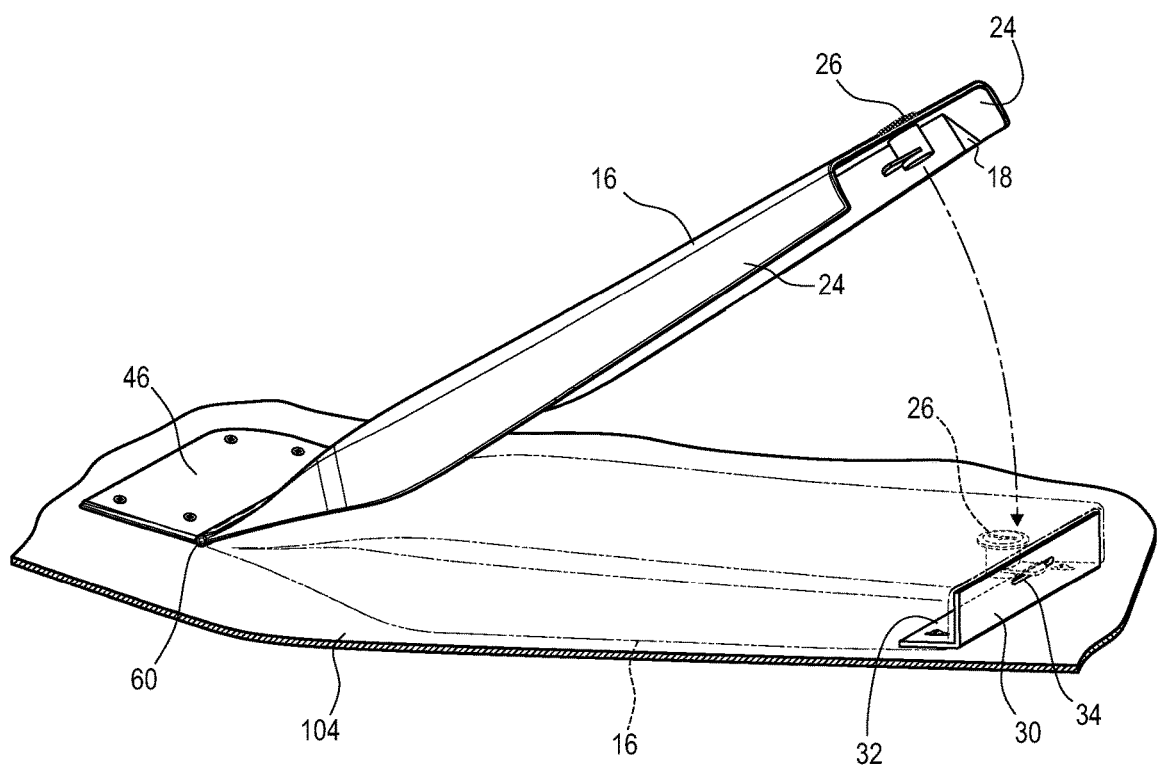
FIG. 15 is a left top perspective view of an embodiment of the concealed, secure storage compartment 10 of FIG. 14 with the containment shield 12 raised.
Figure 16:
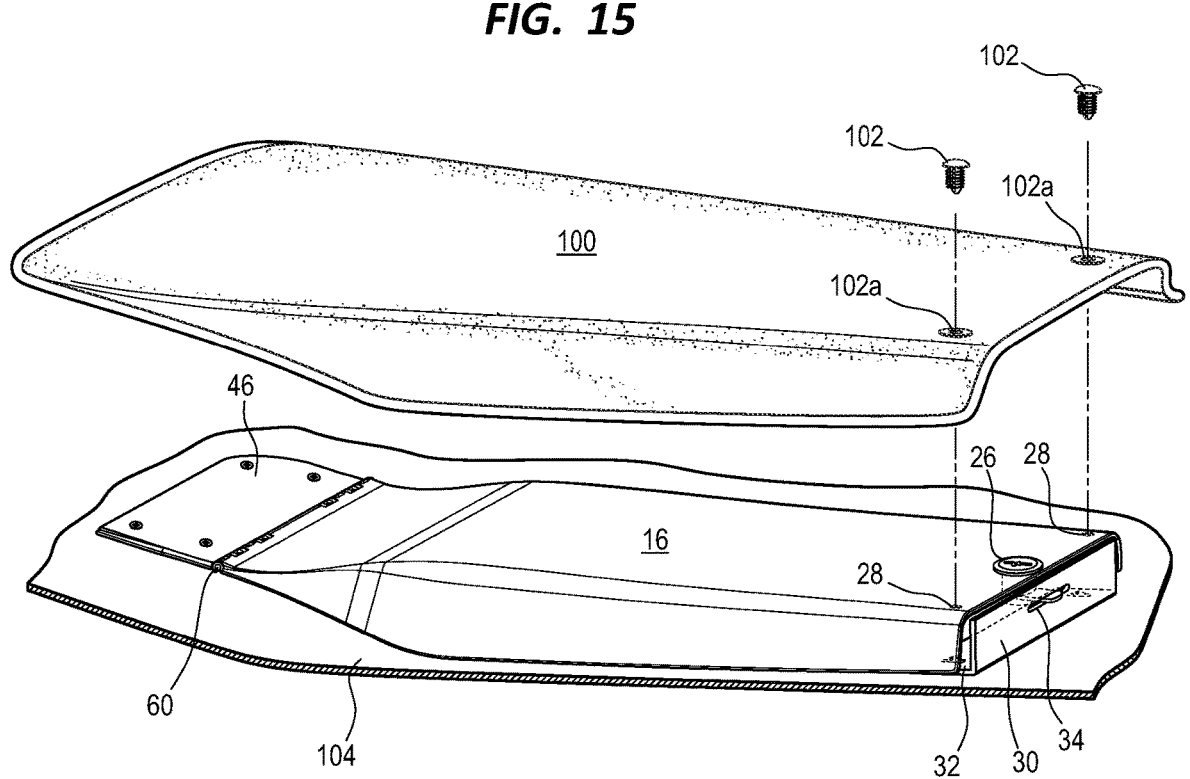
FIG. 16 is an exploded left top perspective view of the concealed, secure storage compartment 10 of FIG. 14 depicting attachment of a floor mat carpet to the containment shield top side 16.
Figure 17:
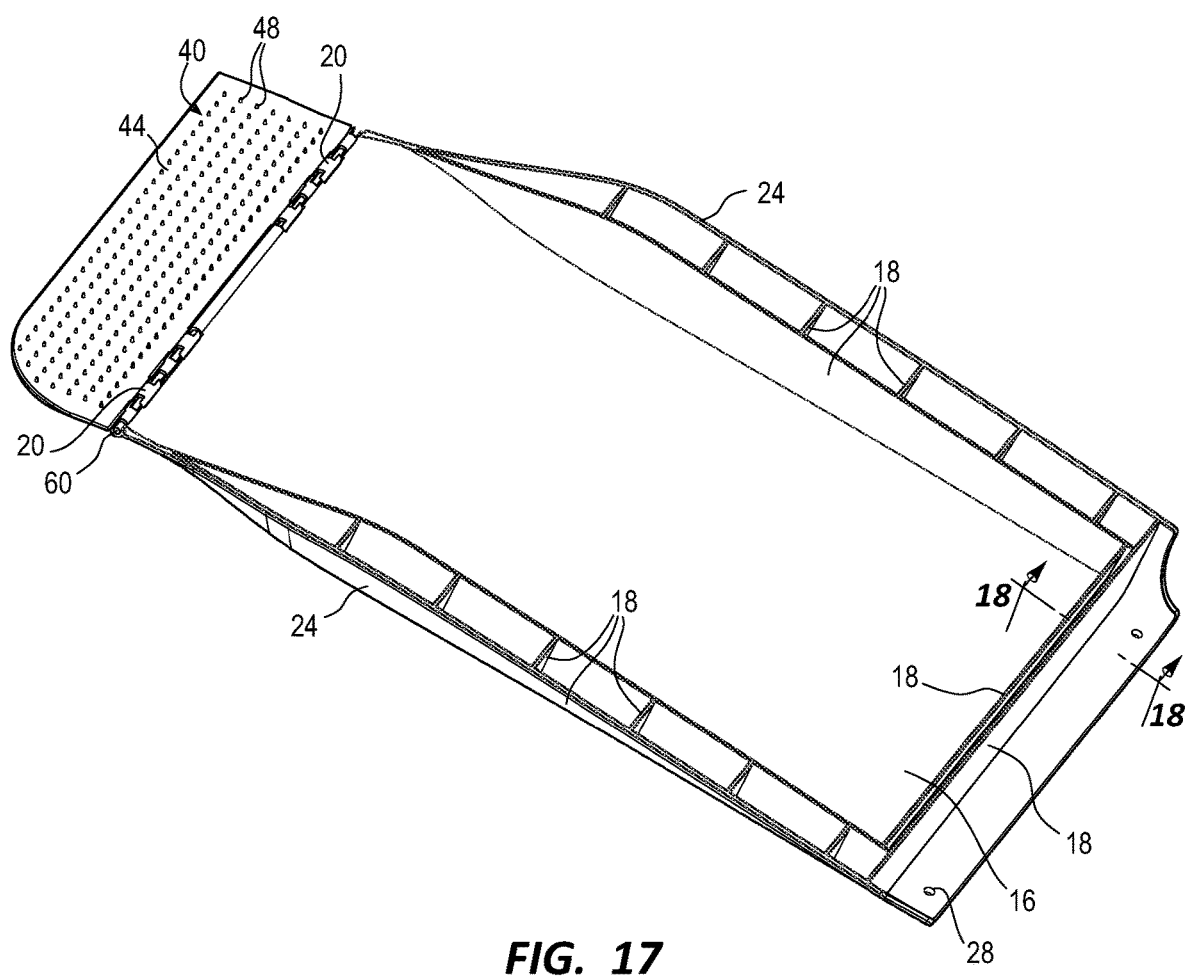
FIG. 17 is a bottom left rear perspective view of the embodiment of concealed, secure storage compartment of FIG. 1, providing a reinforcement ribs 18 including a reinforcement rib 18 across the full-length of the containment shield bottom side near the proximal end.
Figure 18:
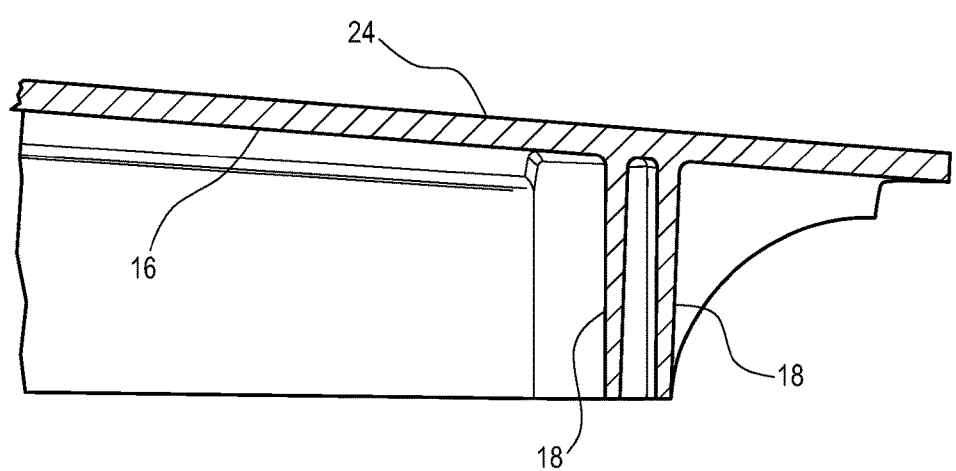
FIG. 18 is a partial cross-sectional view of FIG. 17 taken at "18-18."

An embodiment of a secured, concealed storage compartment 10 provides two attachment pins 102 each sized to be inserted into a washer 102a on a proximal edge of a floormat 100 portion of an automobile vehicle passenger's side floor mat area and through one of the containment shield mount holes 20 to secure the floormat 102 to the containment shield 12, FIGS. 13 and 16. Alternative attachment means using hook and loop fasteners (not depicted) to secure the floormat 102 to the containment shield 12 follow this disclosure for embodiments of a secured, concealed storage compartment 10.

An embodiment of a secured, concealed storage compartment 10 includes at least one hinge pin 60 securing the attachment plate proximal hinged end 42 to the containment shield distal hinged end 20.

An embodiment of a secured, concealed storage compartment 10 provides an attachment assembly to releasably attach the attachment plate bottom surface 44 to a firewall surface with nap or pile 104 of an automobile vehicle passenger's side floor mat area that includes a plurality of attachment portion bottom surface spikes 48 sized to obtain purchase firewall surface with the nap or pile 104 and secure the attachment plate 40 to the firewall, FIGS. 1, 2, 15 and 16.

Figure 12:
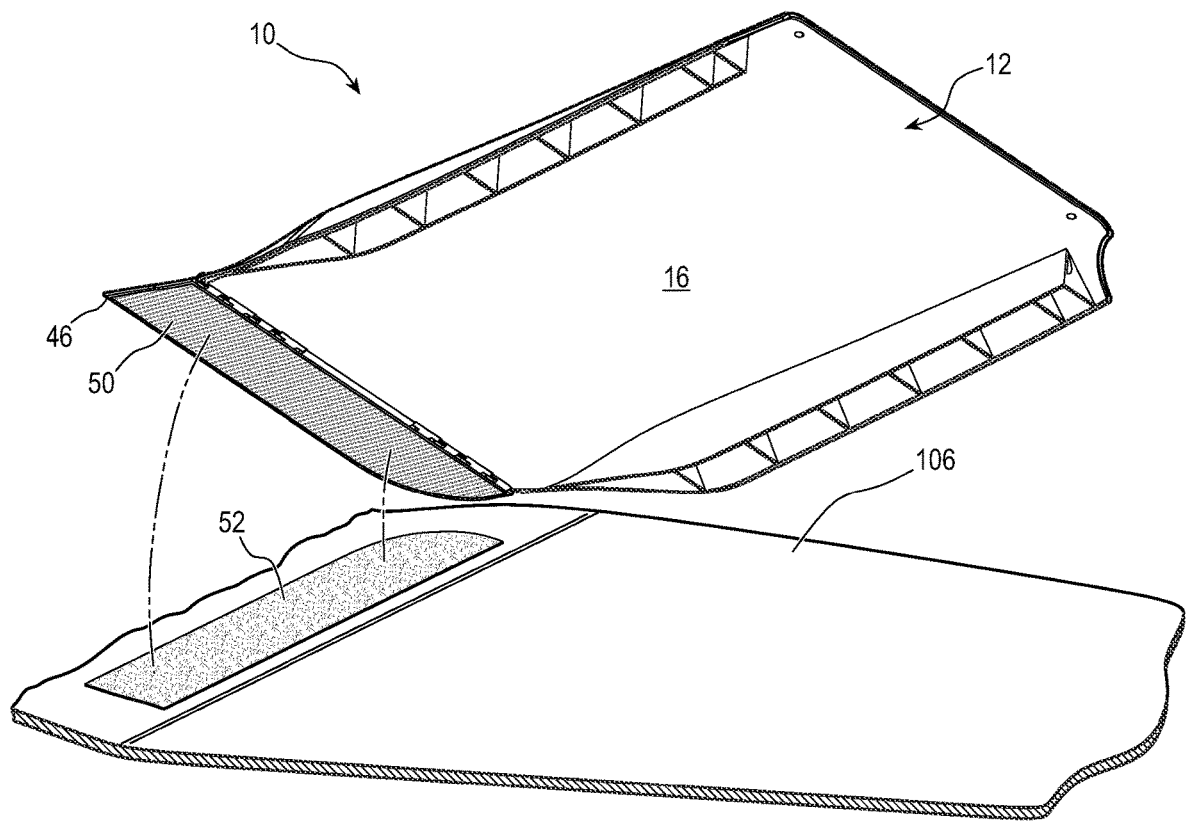
FIG. 12 is a left side perspective bottom view of an embodiment of the concealed, secure storage compartment 10 with hook and loop fasteners 50 on the attachment plate bottom surface 44 and hook and loop fasteners 52 on a firewall floor surface carpet without nap or pile 106.

An embodiment of a secured, concealed storage compartment 10 provides an attachment assembly to releasably attach the attachment plate bottom surface 44 to a firewall surface without nap or pile 106 of an automobile vehicle passenger's side floor mat area that includes a hook and loop attachment assembly 50 on the attachment plate bottom surface 44 in a position to obtain purchase with a hook and loop attachment assembly affixed to the firewall surface 52 and secure the attachment plate to the firewall, FIG. 12.

An embodiment of a secured, concealed storage compartment 10 provides a separate containment shield proximal end surface 30 having a base 32 providing attachment assembly to a floor surface within the automobile vehicle passenger's side floor mat area. A keyed locking assembly 26 on the containment shield topside surface 16 engages a tongued locking element sized to releasably engage a containment shield separate proximal end locking slot 34 to releasably secure the containment shield 12 to the containment shield proximal end surface 30, FIGS. 14-16. Slack in the attachment floormat 102 to the containment shield 12 clears a user's hand to slide between floormat 102 to the containment shield 12 and insert the key into the keyed locking assembly 26 to unlock the keyed locking assembly 26 and lift the containment shield 12 to retrieve stored personal property items 200. In variants providing hook and look attachment of the floormat 102 to the containment shield 12, the user can access the keyed locking assembly by detaching one hook and loop assembly corner of the floormat 102 from the hook and loop assembly on the containment shield 12 to access and unlock the keyed locking assembly 26 and lift the containment shield 12 to retrieve stored personal property items 200.

The disclosed embodiment of a secure, concealed storage compartment space under the containment shield 12 and floormat 100 provides a secure and concealed space to protect personal property items, 200, FIGS. 11A, 11B, 13, 15 and 16.

Embodiments of the secured, concealed storage compartment 10 can be manufactured using three-dimensional printing or injection molding.

Embodiments of the secured, concealed storage compartment 10 can be made from polylactic acid, a bioplastic, using three-dimensional printing or injection molding.

Embodiments of the secured, concealed storage compartment 10 can be made from polycarbonate using three-dimensional printing or injection molding.

A simple and inexpensive secure, concealed automotive vehicle storage compartment 10 that provides an environment to safely house laptop computers, tablet computers, mobile telephones, billfolds, keys, and similar small personal items and keep them from view from outside the vehicle without the necessity of opening outside vehicular storage areas is disclosed. The concealed automotive vehicle storage compartment 10 is easily retrofitted into most existing automobile front passenger seat floor areas. A locking assembly prevents the containment shield 12 and floormat 100 from being raised absent an unlocking key.

What is claimed:

1. A storage compartment comprising in combination:
   A) a containment shield comprising a containment shield topside surface, an underside surface, a proximal end, a distal hinged end, two containment shield side surfaces at equal acute angles from the containment shield topside surface and containment shield underside surface, a plurality of containment shield reinforcement ribs from a containment shield underside surface boundary to each containment shield side surface, and two equal sized containment shield mount holes spaced apart near a containment shield topside surface proximal end and a containment shield underside surface proximal end, the containment shield topside surface and side surfaces sized to fit under a floormat portion of an automobile vehicle passenger's side floor mat area;
   B) an attachment plate comprising a topside surface, a bottom side surface, a proximal hinged end sized to connect to the containment shield distal hinged end, a distal end, and an attachment assembly to releasably attach the attachment plate bottom side surface to a firewall surface of the automobile vehicle passenger's side floor mat area; and
   C) two attachment pins each sized to be inserted into a proximal edge of the floormat portion of an automobile vehicle passenger's side floor mat area and through one of the containment shield mount holes to secure the floormat portion to the containment shield;

whereby a storage compartment space is provided under the containment shield and the floormat portion to secure and conceal personal property items.

2. The storage compartment of claim 1, further comprising at least one hinge pin securing the attachment plate proximal hinged end to the containment shield distal hinged end.

3. The storage compartment of claim 1, further comprising a separate base comprising an attachment assembly for a floor surface within the automobile vehicle passenger's side floor mat area, and an integral locking assembly to releasably secure the containment shield proximal end to the base.

4. The storage compartment of claim 1, wherein the attachment assembly to releasably attach the attachment plate bottom side surface to the firewall surface of the automobile vehicle passenger's side floor mat area comprises a plurality of spikes sized to obtain purchase with a nap or pile portion of the firewall surface and secure the attachment plate to the firewall surface.

5. The storage compartment of claim 1, wherein the attachment assembly to releasably attach the attachment plate bottom side surface to the firewall surface of the automobile vehicle passenger's side floor mat area comprises a hook and loop attachment assembly on the attachment plate bottom side surface positioned to obtain purchase with a hook and loop attachment assembly affixed to the firewall surface and secure the attachment plate to the firewall surface.

6. The storage compartment of claim 3, wherein the integral locking assembly to releasably secure the containment shield proximal end to the base comprises a keyed locking assembly on the containment shield topside surface comprising a tongued locking element sized to releasably engage a containment shield proximal end locking slot.

7. The storage compartment of claim 6, wherein the base attachment assembly for a floor surface within the automobile vehicle passenger's side floor mat area comprises two fasteners, each fastener sized to be received through the base and received in and secured to a vehicle floormat attachment hole of the automobile vehicle passenger's side floor mat area.

8. The storage compartment of claim 1 further comprising a reinforcement rib across a full-length of the containment shield underside surface proximal end between opposite reinforcement ribs of the containment shield underside surface.

9. A storage compartment comprising in combination:
   A) a containment shield comprising a containment shield topside surface, an underside surface, a proximal end, a distal hinged end, two containment shield side surfaces at equal acute angles from the containment shield topside surface and containment shield underside surface, a plurality of containment shield reinforcement ribs extending from a containment shield underside surface boundary to each containment shield side surface, and two equal sized containment shield mount holes spaced apart near a containment shield topside surface proximal end and a containment shield underside surface proximal end, the containment shield topside surface and side surfaces sized to fit under a floormat portion of an automobile vehicle passenger's side floor mat area;

B) a separate base comprising an attachment assembly for a floor surface within the automobile vehicle passenger's side floor mat area, and a base locking slot sized to receive a tongued locking element of a keyed locking assembly on the containment shield topside surface to releasably engage and secure the containment shield proximal end to the base;

C) an attachment plate comprising a topside surface, a bottom side surface, a proximal hinged end sized to connect to the containment shield distal hinged end, a distal end, and an attachment assembly to releasably attach the attachment plate bottom side surface to a firewall surface of the automobile vehicle passenger's side floor mat area;

D) two attachment pins each sized to be inserted into a proximal edge of the floormat portion of an automobile vehicle passenger's side floor mat area and through one of the containment shield mount holes to secure the floormat portion to the containment shield; and E) at least one hinge pin securing the attachment plate proximal hinged end to the containment shield distal hinged end;

whereby a storage compartment space is provided under the containment shield and the floormat portion to secure and conceal personal property items.

10. The storage compartment of claim 9, wherein the attachment assembly is adapted to releasably attach the attachment plate bottom side surface to a firewall surface with nap or pile of an automobile vehicle passenger's side floor mat area and comprises a plurality of attachment portion bottom surface spikes sized to obtain purchase with the nap or pile and secure the attachment plate to the firewall surface.

11. The storage compartment of claim 9, wherein the attachment assembly to releasably attach the attachment plate bottom side surface to a firewall surface of an automobile vehicle passenger's side floor mat area comprises a hook and loop attachment assembly on the attachment plate bottom side surface positioned to obtain purchase with a hook and loop attachment assembly affixed to the firewall surface and secure the attachment plate to the firewall surface.

12. The storage compartment of claim 9 further comprising a reinforcement rib across a full-length of the containment shield underside surface proximal end between opposite reinforcement ribs of the containment shield underside surface.

13. A storage compartment comprising in combination:

A) a containment shield comprising a topside surface, and underside surface, a proximal end, a distal hinged end, two containment shield side surfaces at equal acute angles from the containment shield topside surface and containment shield underside surface, a plurality of containment shield reinforcement ribs extending from a containment shield underside surface boundary to each containment shield side surface, and two equal sized containment shield mount holes spaced apart near the containment shield proximal end, the containment shield topside surface and side surfaces sized to fit under a floormat portion of an automobile vehicle passenger's side floor mat area;

B) an attachment plate comprising a topside surface, a bottom side surface, a proximal hinged end sized to connect to the containment shield distal hinged end, a distal end, and an attachment assembly to releasably attach the attachment plate bottom side surface to a firewall surface of the automobile vehicle passenger's side floor mat area;

C) two attachment pins each sized to be inserted into a proximal edge of the floormat portion of the automobile vehicle passenger's side floor mat area and through one of the containment shield mount holes to secure the floormat portion to the containment shield; and D) at least one hinge pin securing the attachment plate proximal hinged end to the containment shield distal hinged end;

whereby a storage compartment space is provided under the containment shield and the floormat portion to secure and conceal personal property items.

14. The storage compartment of claim 13, wherein the attachment assembly to releasably attach the attachment plate bottom side surface to the firewall surface of the automobile vehicle passenger's side floor mat area comprises a plurality of spikes sized to obtain purchase with a nap or pile portion of the firewall surface and secure the attachment plate to the firewall surface.

15. The storage compartment of claim 13, wherein the attachment assembly to releasably attach the attachment plate bottom side surface to a firewall surface of the automobile vehicle passenger's side floor mat area comprises a hook and loop attachment assembly on the attachment plate bottom side surface positioned to obtain purchase with a hook and loop attachment assembly affixed to the firewall surface and secure the attachment plate to the firewall surface.

16. The storage compartment of claim 15 further comprising a reinforcement rib across a full-length of the containment shield underside surface proximal end between opposite reinforcement ribs of the containment shield underside surface.

17. The storage compartment of claim 14 further comprising a reinforcement rib across a full-length of the containment shield underside surface proximal end between opposite reinforcement ribs of the containment shield underside surface.

* * * * *